US012779924B2

(12) United States Patent
Mistry et al.

(10) Patent No.: US 12,779,924 B2
(45) Date of Patent: Nov. 3, 2026

(54) TRANSIENT UNLOADING OF IMPEDED VEHICLE WHEELS

(71) Applicant: JAGUAR LAND ROVER LIMITED, Whitley (GB)

(72) Inventors: Anesh Mistry, Coventry (GB); Luke Birch, Mickleton (GB); Sam Brown, Kingsbridge (GB); Dennis Lausecker, Coventry (GB); Syed Asad Ali, Coventry (GB); William Burdock, Sutton Coldfield (GB); James Kelly, Solihull (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 210 days.

(21) Appl. No.: 18/039,237

(22) PCT Filed: Nov. 25, 2021

(86) PCT No.: PCT/EP2021/083058
§ 371 (c)(1),
(2) Date: May 27, 2023

(87) PCT Pub. No.: WO2022/112449
PCT Pub. Date: Jun. 2, 2022

(65) Prior Publication Data

US 2023/0415535 A1 Dec. 28, 2023

(30) Foreign Application Priority Data

Nov. 27, 2020 (GB) ...................................... 2018681

(51) Int. Cl.
*B60G 17/0165* (2006.01)
*B60W 10/22* (2006.01)

(52) U.S. Cl.
CPC ......... *B60G 17/0165* (2013.01); *B60W 10/22* (2013.01); *B60G 2202/413* (2013.01); *B60G 2400/60* (2013.01)

(58) Field of Classification Search
CPC .......... B60G 17/0165; B60G 2202/413; B60G 2400/60; B60G 2400/102; B60G 2400/32;
(Continued)

(56) References Cited

U.S. PATENT DOCUMENTS

| | | | | |
|---|---|---|---|---|
| 7,070,247 B2 * | 7/2006 | Offerle | B60G 17/016 701/72 |
| 7,229,139 B2 * | 6/2007 | Lu | B60W 10/18 180/6.26 |

(Continued)

FOREIGN PATENT DOCUMENTS

| | | |
|---|---|---|
| CN | 103921645 A | 7/2014 |
| CN | 106553495 A | 4/2017 |

(Continued)

OTHER PUBLICATIONS

International Search Report and Written Opinion for Application No. PCT/EP2021/083058, dated Mar. 24, 2022, 17 pages.

(Continued)

*Primary Examiner* — Lindsay M Low
*Assistant Examiner* — Susan E Scharpf
(74) *Attorney, Agent, or Firm* — TROUTMAN PEPPER LOCKE LLP; Dustin B. Weeks; Nicholas H. Doss

(57) ABSTRACT

A control system (300) for controlling an active suspension system (104) of a vehicle (100), the vehicle having one or more leading wheels (FL, FR) and one or more trailing wheels (RL, RR), the control system comprising one or more controller (301), wherein the control system is configured to: determine (708) that vehicle movement is impeded at a leading wheel (FR) of the vehicle; and in
(Continued)

dependence on the determination, transmit (712) a transient force request to the active suspension system to transiently unload the leading wheel.

20 Claims, 4 Drawing Sheets

(58) Field of Classification Search
CPC .......... B60G 2400/41; B60G 2400/823; B60G 2401/28; B60G 2500/30; B60G 2400/30; B60G 2400/42; B60G 2400/61; B60G 2500/10; B60G 2800/213; B60G 2800/214; B60G 17/00; B60G 2800/0124; B60W 10/22; B60W 30/02; B60W 40/064
See application file for complete search history.

(56) References Cited

U.S. PATENT DOCUMENTS

| | | | | |
|---|---|---|---|---|
| 10,334,050 | B2 * | 6/2019 | Kentley-Klay | G06F 3/0482 |
| 2008/0119984 | A1 * | 5/2008 | Hrovat | B62D 9/00 701/41 |
| 2013/0197732 | A1 * | 8/2013 | Pearlman | A61G 5/00 701/1 |
| 2014/0195114 | A1 * | 7/2014 | Tseng | B60G 17/015 701/1 |
| 2014/0330483 | A1 * | 11/2014 | Lu | B60G 17/016 701/37 |
| 2017/0087951 | A1 * | 3/2017 | Hrovat | B60G 17/018 |
| 2021/0188252 | A1 * | 6/2021 | Lu | B60W 40/12 |
| 2022/0234589 | A1 * | 7/2022 | Cserna | G05D 1/0227 |
| 2022/0281477 | A1 * | 9/2022 | Coyle | B60W 30/04 |

FOREIGN PATENT DOCUMENTS

| | | | |
|---|---|---|---|
| CN | 208452767 | U | 2/2019 |
| CN | 110861461 | A | 3/2020 |
| CN | 112319652 | A | 2/2021 |
| GB | 2544611 | A | 5/2017 |
| IN | 111361659 | A | 7/2020 |
| KR | 20200074701 | A | 6/2020 |
| WO | 8900928 | A1 | 2/1989 |

OTHER PUBLICATIONS

Combined Search and Examination Report for Application No. GB2018681.3, dated Aug. 24, 2021, 8 pages.
Office Action received in related Chinese Patent Application No. 202180079416.5, mailed Jan. 24, 2026 (with machine translation) (14 pages).

* cited by examiner

TRANSIENT UNLOADING OF IMPEDED VEHICLE WHEELS

TECHNICAL FIELD

The present disclosure relates to transient unloading of impeded vehicle wheels. In particular, but not exclusively it relates to controlling an active suspension system to transiently unload a vehicle wheel that is impeded by a climbable obstacle.

BACKGROUND

When a vehicle approaches an obstacle, the wheel torque required to climb the obstacle can exceed the available traction or available torque of the vehicle.

If the obstacle is climbable, a substantial wheel torque increase may be required in order to climb the obstacle, which can lead to a reduction of composure of the vehicle. This can cause wheel slip while ascending the obstacle. In addition, once the obstacle has been climbed, the excess torque can result in overshooting of the vehicle.

In this disclosure, a climbable obstacle primarily refers to step-like or ramp-like obstacles in terrain, such as boulders, steps, ledges or high kerbs.

SUMMARY OF THE INVENTION

It is an aim of the present invention to address one or more of the disadvantages associated with the prior art.

According to an aspect of the invention there is provided a control system for controlling an active suspension system of a vehicle, the vehicle having one or more leading wheels and one or more trailing wheels, the control system comprising one or more controller, wherein the control system is configured to: determine that vehicle movement is impeded at a leading wheel of the vehicle (the impeded wheel); and in dependence on the determination, transmit a transient force request to the active suspension system to transiently unload the impeded wheel.

In some examples, the transient force request is configured to cause the transient unloading of the impeded wheel without causing transient unloading of a lateral leading wheel laterally separated from the impeded wheel.

In some examples, the transient force request is configured to cause transient increased loading of the lateral leading wheel.

In some examples, the transient force request is configured to cause transient increased loading of a trailing wheel to a same lateral side of the vehicle as the leading wheel.

In some examples, the transient force request is configured to cause transient unloading of a lateral trailing wheel laterally separated from the leading wheel.

In some examples, the control system is configured to cause transient increased loading of a diagonal pair of wheels and transient unloading of a different diagonal pair of wheels.

In some examples, the control system is configured to: in dependence on the determination, transmit a torque increase request to a torque source of the vehicle, to cause tractive torque to be at an increased magnitude when the leading wheel is unloaded.

In some examples, the determination is dependent on information from one or more of: an object detection sensor system configured to detect a climbable obstacle in a path of the at least one leading wheel; a steering torque sensor configured to detect torque in a steering system of the vehicle coupled to the leading wheel, resulting from the leading wheel being impeded relative to another leading wheel; a set of suspension displacement-based sensors; at least one wheel hub-mounted accelerometer; or at least one vehicle body accelerometer.

In some examples, transmitting the transient force request is dependent on determining that an obstacle in a path of the leading wheel is a climbable obstacle or a non-climbable obstacle, in dependence on data from one or more sensors.

In some examples, determining whether the vehicle movement is impeded by a climbable obstacle or a non-climbable obstacle comprises determining whether a detected height of the detected obstacle is less than a height threshold.

In some examples, the control system is configured to: receive information indicative of a user trigger request; and in dependence on receiving the user request, monitor for satisfaction of a condition that vehicle movement is impeded at the leading wheel of the vehicle, wherein the transient force request is transmitted when the condition is satisfied.

In some examples, the transient force request is configured to request sufficient transient unloading of the leading wheel to transiently lift the leading wheel away from the ground so as to reduce or remove a point of contact between the a tyre of the leading wheel and the obstacle to reduce driving torque necessary to overcome the obstacle.

In some examples, the control system is configured to determine attempted vehicle movement, wherein the transient force request is transmitted in dependence on the determination of attempted vehicle movement and on the determination that vehicle movement is inhibited, wherein the determination of attempted vehicle movement is dependent on one or more of: requested torque being greater than a threshold; requested vehicle braking being less than a threshold; requested vehicle speed being greater than a threshold; or an indication that a torque source of the vehicle is coupled to a set of one or more drive wheels of the vehicle.

In some examples, the transient force request is maintained for no longer than a predetermined time.

In some examples, the predetermined time is from the range approximately 0.1 seconds to approximately twenty seconds.

In some examples, the transient force request is terminated in dependence on detection that the vehicle movement is no longer impeded at the leading wheel.

In some examples, the control system is configured to: after the transient unloading of the leading wheel, transmit a trailing wheel transient force request to the active suspension system to cause transient unloading of the trailing wheel.

In some examples, the control system is configured to: in dependence on the determination that vehicle movement is impeded at a leading wheel, control the active suspension system to reduce a wheel rate at the leading wheel.

According to a further aspect of the invention there is provided a control system for controlling an active suspension system of a vehicle, the control system comprising one or more controller, wherein the control system is configured to: determine a transient suspension unloading request indicating a selected lateral side of the vehicle; and in dependence on the determination, transmit a transient force request to the active suspension system to cause transient unloading of a wheel of the vehicle at the selected lateral side of the vehicle.

According to a further aspect of the invention there is provided an active suspension system comprising the control system.

According to a further aspect of the invention there is provided a vehicle comprising the control system or the active suspension system.

According to a further aspect of the invention there is provided a method of controlling an active suspension system of a vehicle, the method comprising: determining that vehicle movement is impeded at a leading wheel of the vehicle; and in dependence on the determination, transmitting a transient force request to the active suspension system to transiently unload the leading wheel.

According to a further aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controller may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
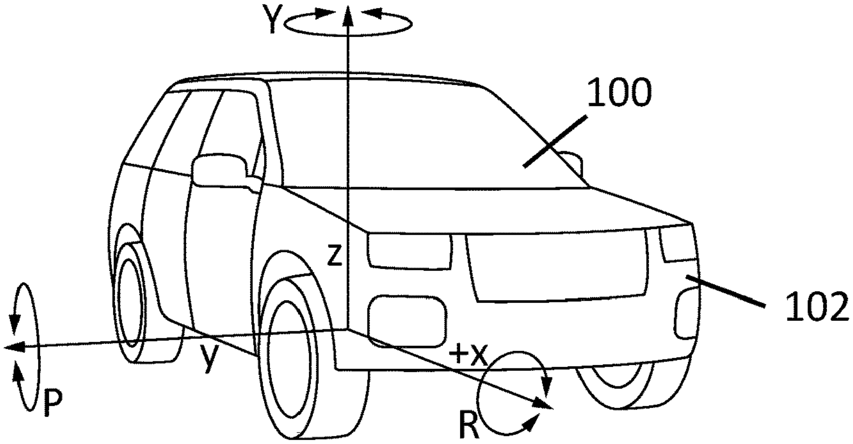
FIG. 1 illustrates an example vehicle and a coordinate system.

FIG. 1 illustrates an example of a vehicle 100 in which embodiments of the invention can be implemented. In some, but not necessarily all examples, the vehicle 100 is a passenger vehicle, also referred to as a passenger car or as an automobile. In other examples, embodiments of the invention can be implemented for other applications, such as industrial or commercial vehicles. The vehicle 100 has a vehicle body 102 (sprung mass) supported by a suspension.

FIG. 1 also illustrates a coordinate system. The x-axis is the longitudinal axis. A vehicle body rotation 'R' about the x-axis is roll. The y-axis is the lateral axis. A vehicle body rotation 'P' about the y-axis is pitch. The z-axis is the vertical axis. A vehicle body rotation 'Y' about the z-axis is yaw.

In the examples described herein, the vehicle 100 is assumed to be travelling forward (+x) such that front wheels of the vehicle 100 are leading wheels, and rear wheels are trailing wheels. If the vehicle 100 is travelling in reverse, the rear wheels would be leading wheels and the front wheels would be trailing wheels.

Figure 2:
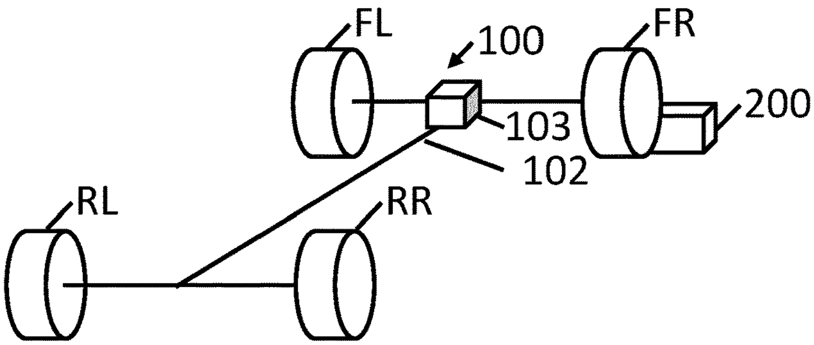
FIG. 2 illustrates an example vehicle with a leading wheel impeded by a climbable obstacle.

FIG. 2 schematically illustrates a leading wheel FR of a vehicle 100 being impeded. In this example, but not necessarily all examples, the leading wheel FR is at the base of a climbable obstacle 200 such as a step, ledge, kerb or boulder.

In this context, the term 'impede' refers to the wheel FR being unable to climb the obstacle 200 without substantial additional torque being applied. The vehicle 100 is not stuck, that is to say, incapable of negotiation the obstacle, in this case the vehicle can negotiate the obstacle if other actions are taken, for example, if more torque is sent to the impeded wheel. The term 'climbable' refers to obstacles that are climbable with extra torque, and also refers to obstacles that would not be climbable at all without this invention. Climbing means cresting the obstacle so that the vehicle 100 can continue driving.

The vehicle 100 has a front right wheel FR to a first lateral side of the vehicle 100, a front left wheel FL to a second lateral side of the vehicle 100, laterally separated from the front right wheel FR. The front left and right wheels FL, FR are leading wheels when the vehicle 100 is moving forwards. The vehicle 100 has a rear right wheel RR to the first lateral side and a rear left wheel RL to the second lateral side, which are trailing wheels in this example.

In this example, the impeded wheel is the front right wheel FR. The front left wheel FL is not impeded by the climbable obstacle 200. The rear left and right trailing wheels RL, RR are not impeded. In another scenario, the impeded wheel could be the front left wheel FL rather than the front right wheel FR.

In order to climb the obstacle 200, the tractive force of the vehicle 100 should remain consistently high even if the wheel is slipping, so that the wheel does not fall back down. The required torque should be within the capabilities of a torque source 103 of the vehicle 100, such as an engine or an electric machine.

Figure 3:
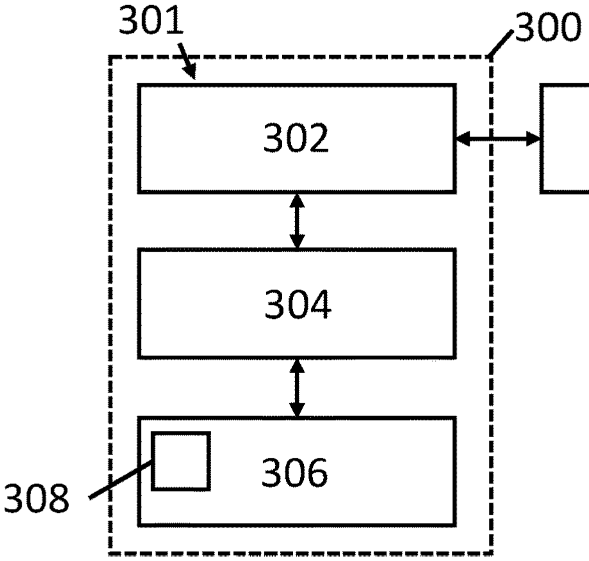
FIG. 3 illustrates an example control system.

In embodiments of the present invention, the suspension is an active suspension system that can be controlled by a control system 300 such as the one shown in FIG. 3. The active suspension system is capable of lifting a vehicle wheel away from the ground, to unload the wheel. The wheel may remain in contact with the ground in a partially unloaded state or may be lifted into the air in a fully unloaded state. This reduces the torque required to climb the obstacle 200. The active suspension system may also be configured to control other characteristics such as wheel rate, damping rate, and/or ride height. Additional intervention can be applied, such as one or more of: locking a differential across an axle of the impeded wheel; increasing brake force to the unimpeded wheel across the same axle as the impeded wheel so as to ensure maximum torque is sent to the impeded wheel with the minimum of unwanted wheel slip. The additional intervention will further improve composure and can mitigate against overshoot causing the vehicle 100 to lurch over the obstacle.

An active suspension system 104 and the control system 300 will first be described.

The control system 300 of FIG. 3 comprises a controller 301. In other examples, the control system 300 may comprise a plurality of controllers on-board and/or off-board the vehicle 100. In some examples, a control system 300 or a controller 301 may be supplied as part of an active suspension system 104.

The controller 301 of FIG. 3 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components such as the active suspension system 104.

Figure 4:
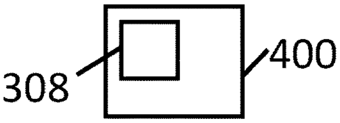
FIG. 4 illustrates an example of a non-transitory computer-readable storage medium.

FIG. 4 illustrates a non-transitory computer-readable storage medium 400 comprising the instructions 308 (computer software).

Figure 5:
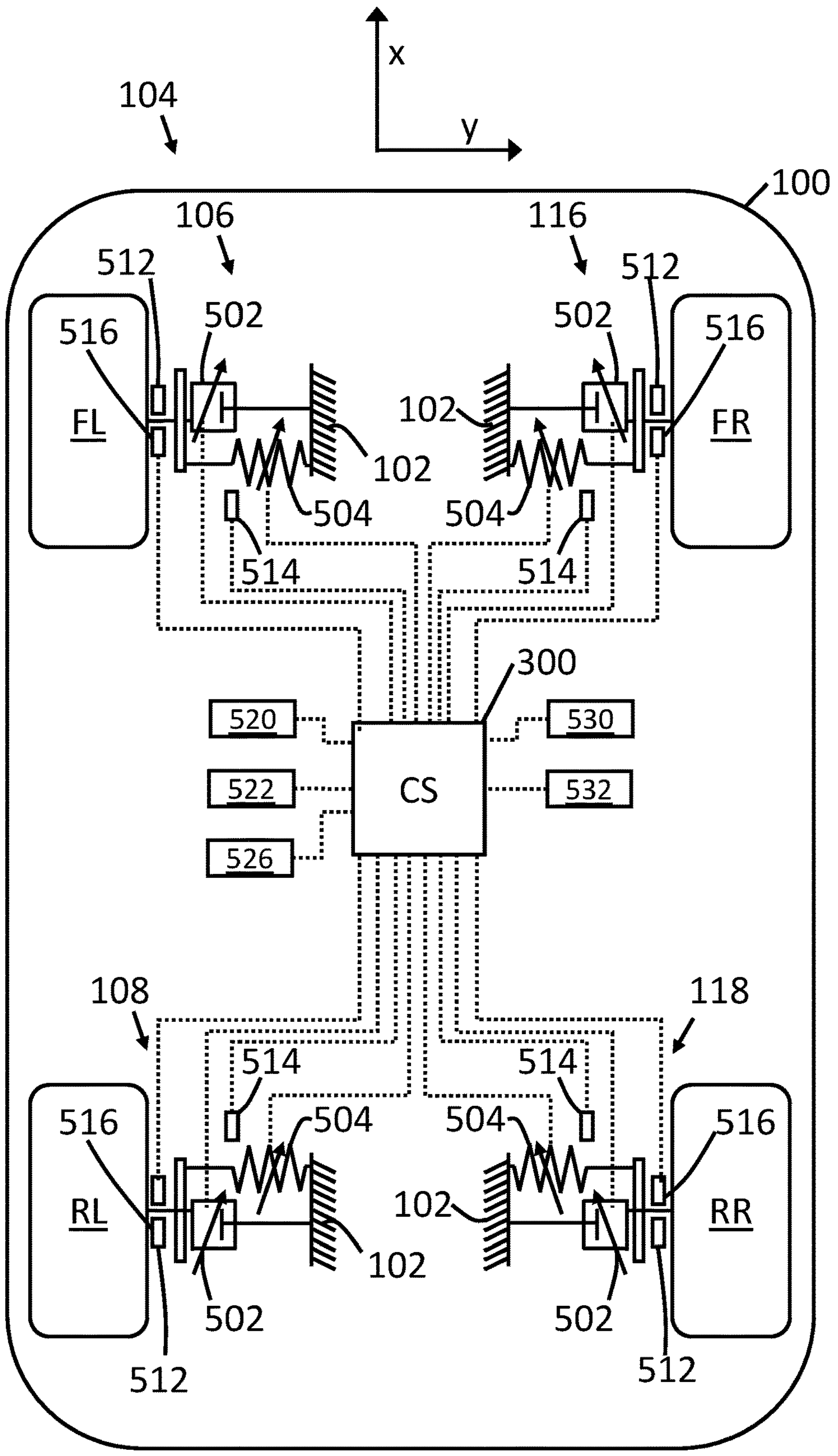
FIG. 5 illustrates an example of an active suspension system of a vehicle.

FIG. 5 illustrates an example implementation of the active suspension system 104.

The active suspension system 104 comprises front left active suspension 106 for a front left wheel FL, front right active suspension 116 for a front right wheel FR, rear left active suspension 108 for a rear left wheel RL, and rear right active suspension 118 for a rear right wheel RR. The active suspension for each wheel (e.g. quarter/corner) of the vehicle 100 may be individually controllable.

The active suspension for each corner of the vehicle 100 comprises an actuator 502.

The actuator 502 may be a hydraulic actuator such as a hydraulic fluid-filled chamber containing a piston. One end of the actuator 502 is coupled to a vehicle wheel and the other end is coupled to the vehicle body 102. A spring 504 (e.g. coil or pneumatic) may be in equilibrium and acting in parallel with the actuator 502.

When the vehicle suspension is undisturbed, the piston of the hydraulic actuator 502 sits at a particular neutral position in the chamber.

The piston can move in either direction inside the chamber, e.g. due to a road disturbance compressing the actuator 502. The piston can displace fluid out of the chamber into a hydraulic circuit (not shown). The fluid imparts a restoring force against movement of the piston. Energy can be added to and/or extracted from the actuator 502 by pumping fluid and/or controlling valves to regulate fluid pressure to either side of the piston.

Therefore, a control system 300 can dynamically control restoring force against the displaced piston by outputting a force request (also referred to as a force demand). This force is equivalent to spring force of a coil spring against displacement. Dynamic control enables the force-displacement relationship to be changed to adapt to a driving scenario. Energy can be added or removed quickly, e.g. within tens of milliseconds. In order to control spring force, the control system 300 may output a force demand that is dependent on sensed wheel travel (wheel-to-body displacement/articulation).

Dynamic damping characteristics of the actuator 502 can be modified by controlling a fluid valve at a constriction, which regulates the rate at which fluid is transferred in and out of the actuator 502 by movement of the piston.

Further, energy can be added to or removed from the actuator 502 in order to extend or retract the actuator 502. In some implementations, the active suspension system 104 is operable to lift a wheel entirely off the ground.

Wheel travel may be sensed by a wheel-to-body displacement sensor 514 (suspension displacement-based sensor), for example. The wheel-to-body displacement sensor 514 is placed somewhere on the active suspension and can sense the position of the wheel along an arc defined by suspension geometry. An example of a wheel-to-body displacement sensor 514 is a rotary potentiometer attached to a lever, wherein one end of the lever is coupled to the vehicle body 102, and the other end is coupled to a suspension link.

In some examples, the control system 300 more accurately determines the wheel travel and/or its associated derivatives by fusing information from the wheel-to-body displacement sensor 514 with information from wheel hub accelerometers 516 and/or body accelerometers.

The above example refers to a hydraulic actuator 502, and in other embodiments the actuator may be an electromagnetic actuator or a pneumatic actuator, or the like.

In FIG. 5, but not necessarily all examples, the spring 504 comprises a pneumatic spring, enabling control of ride height. The control system 300 may be configured to pump gas (e.g. air) in or out of the pneumatic spring 504 to control ride height. An air-levelling function of the control system 300 seeks to maintain a set ride height irrespective of vehicle load and achieves this by modifying the volume of air and therefore air pressure to maintain the set ride height.

Additionally or alternatively, the spring 504 comprises a passive spring (e.g. coil) or is omitted entirely. For example, the actuator 502 can control transient and long-term ride height at the cost of increased energy consumption.

In some examples, a force request that is transmitted to the active suspension or a low-level controller thereof is an arbitrated force request based on requests from various requestors and information from various sensors.

FIG. 5 illustrates additional optional features that may interact with the control system 300 to influence force demand calculation. These include any one or more of:

- A wheel speed sensor 512 for each wheel. In an example implementation, the wheel speed sensor 512 is part of an antilock braking system (ABS).
- A hub-mounted accelerometer 516 for each wheel, coupled to the unsprung mass of the vehicle 100. Like the wheel-to-body displacement sensor 514, a hub-mounted accelerometer 516 can also be regarded as a suspension displacement-based sensor because wheel hub acceleration in the z-axis is dependent on a rate of change of suspension displacement.
- A human-machine interface (HMI) 520. This refers to any of the various input devices and input/output devices available to the driver such as touchscreens, displays, hardware switches/sliders/selectors or the like.
- At least one vehicle body accelerometer 522 coupled to the vehicle body 102 (sprung mass). A particular example includes a 3DOF or 6DOF inertial measurement unit (IMU). A unit may comprise an accelerometer or a multi-axis set of accelerometers.
- At least one object detection sensor system 526 configured to detect proximity to objects. Example systems include a camera, a lidar sensor, a radar sensor, an ultrasonic sensor, or a combination thereof. Cameras, lidar and radar sensors provide an image indicative of topography that can be converted to a 3D point cloud or discretized in some other way. The sensors may be located around the vehicle 100 each having different fields of view.

At least one steering sensor 530 including a steering torque sensor and optionally a steering angle sensor. A steering torque sensor is also referred to as a steering force sensor. The steering torque sensor is able to detect positive and negative torque in the steering system to indicate which steerable wheel is impeded: e.g. front left FL or front right FR. A steering angle sensor indicates an angle of a steering rack.

A driveline torque sensor 532 configured to detect positive and negative torque between the torque source 103 and one or more wheels.

Figure 6A:
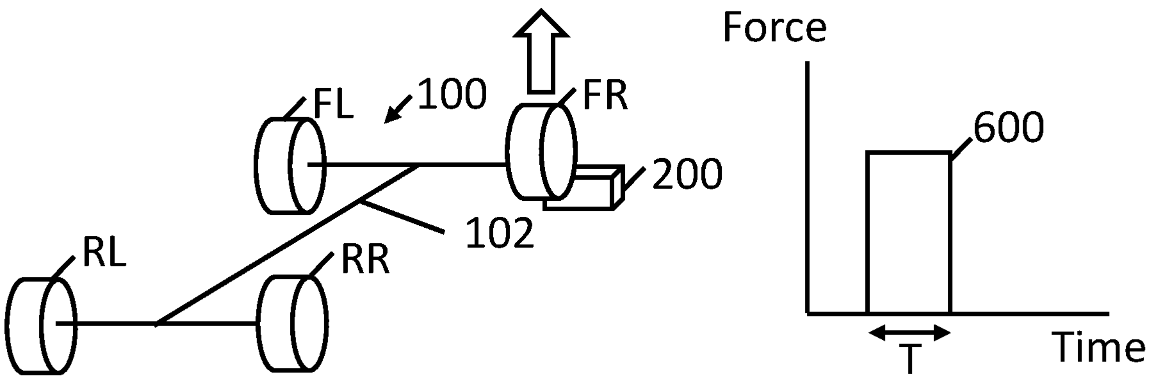
FIGS. 6A, 6B, 6C illustrate examples of loading/unloading wheels for obstacle climbing.
Figure 6B:
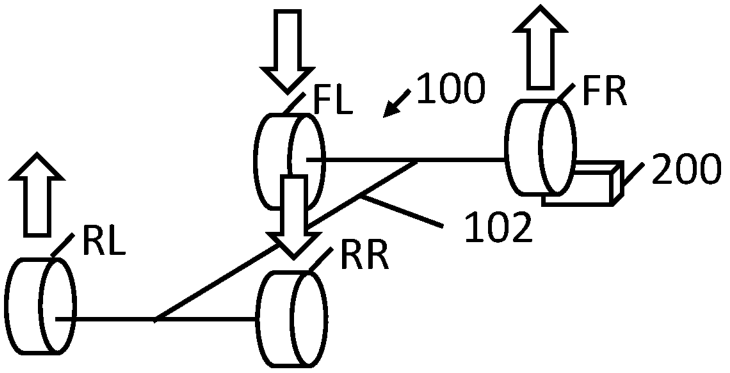
Figure 6C:
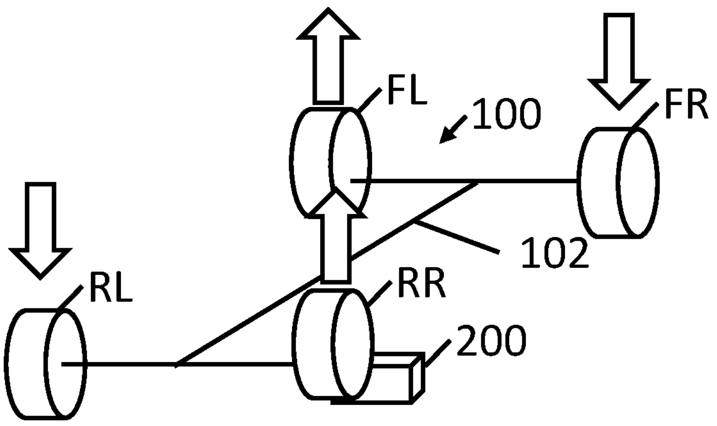

FIGS. 6A to 6C illustrate how an active suspension system 104 can be controlled in order to unload impeded wheels, to reduce the driving torque required to climb the obstacle 200 of FIG. 2. Arrows indicate whether wheels are lifted towards the vehicle body 102 (unloading), or pushed away from the vehicle body 102 (loading)

According to a first embodiment, FIG. 6A illustrates unloading of only the impeded leading wheel FR without changing a loading of the other wheels.

Unloading the impeded wheel FR may comprise retracting the actuator 502 of its associated suspension 116. It should be noted that whether retraction or extension is required depends on the type of mechanism linking the actuator 502 to the wheel.

The unloaded leading wheel FR is lifted away from the ground so as to reduce driving torque necessary to overcome the obstacle 200.

In at least some examples, the impeded leading wheel FR is only unloaded for a short time duration. There is no need to lift the wheel for an indefinite length of time. The purpose of the unloading is to start the wheel moving upwards, to momentarily reduce the torque required needed to climb the step. The embedded force-time graph of FIG. 6A illustrates that the force request is a transient pulse 600 of duration T. The illustrated pulse 600 is square, but it could be ramped or stepped.

The term transient means that the force request is maintained for no longer than a short time T which may be predetermined.

In a first example the predetermined time T is a timeout time. The timeout time T is from the range approximately 1 second to approximately 20 seconds. If progress is not detected by expiry of the timeout time, the force request is cancelled.

In a second example the predetermined time is a set pulse duration for an open-loop implementation. The set pulse duration could be from the range approximately 0.1 seconds to approximately 5 seconds.

If the predetermined time is too long, the driver could feel a body disturbance. The impeded wheel FR may be lifted for too long if it only takes a short time to climb the obstacle. Other wheels could even sink in soft ground. The predetermined time is long enough that the impeded wheel FR is not just being lifted against the inertia of the sprung mass.

In a closed-loop implementation, the force request can be maintained until feedback indicates that the vehicle 100 has started making progress (or earlier if the timeout time expires, if there is a timeout time).

The feedback could comprise one or more of: increasing vehicle speed over ground; an indication that the vehicle 100 is no longer climbing the obstacle (wheel-to-body displacements and/or hub/body accelerations); or steering torque/force.

In some examples, the force request could increase in magnitude until the feedback indicates that the vehicle 100 has started making progress over the obstacle. Therefore, the wheel FR is lifted no further than necessary.

In some examples, the transient force request may be terminated in dependence on detection that the leading wheel is no longer impeded. In some examples, the transient force request may be terminated at the earlier of expiry of the predetermined time or the detection that the leading wheel is no longer impeded.

FIG. 6B illustrates a second embodiment, in which additional wheels of the vehicle 100 are loaded/unloaded to further unload the impeded wheel FR in addition to unloading the impeded wheel FR. This makes it even easier to climb the obstacle 200.

In this example, but not necessarily all examples the control system 300 is configured to cause transient increased loading of a diagonal pair of wheels and transient unloading of a different diagonal pair of wheels.

As a result, the loaded wheels support the weight of the vehicle body 102 to a greater extent than the unloaded wheels. If the unloaded wheels are still in contact with the ground, they may still bear a small amount of weight, and help to keep the vehicle body 102 stable. If the unloaded wheels are not in contact with the ground, the vehicle 100 might seesaw about the loaded wheels which is a possible implementation for further increasing wheel lift but might be more noticeable to the driver. It should be noted that keeping some normal force through all wheels (including the unloaded ones) will help to improve composure by avoiding the bumping sensation that would be perceivable by the occupants when the tyre lifts up off the ground only to fall back down onto it. Additionally, this will mitigate against trail erosion by limiting unwanted wheelspin as all tyres remain in contact with the ground and are never ‘dropped’ back to earth whilst spinning. Correspondingly, this helps to reduce the reliance on stability control/brake intervention, reducing tyre and brake wear.

The loading and the unloading occur concurrently in FIG. 6B. That is, the force request to the active suspension of each wheel at least partially overlaps in time or is at the same time.

When the impeded wheel is the front right wheel FR as shown, the front left and rear right wheels FL, RR are loaded and the front right and rear left wheels FR and RL are unloaded.

However, when the impeded wheel is instead the front left wheel FL, the front right and rear left wheels FR, RL are loaded and the front left and rear right wheels FL, RR are unloaded.

If the terrain is known to be soft (e.g. based on driver-input terrain information and/or sensor-detected terrain information), a single wheel could be lifted as shown in FIG. 6A to spread the load between the other three wheels. For other types of terrain, the pattern of FIG. 6B could be used.

In a third embodiment (not illustrated), the climbable obstacle is wide in the y-axis and impedes both leading wheels concurrently. This is the most difficult type of obstacle to climb because neither of the leading wheels has high tractive force. In this scenario, both leading wheels can be momentarily unloaded if the active suspension system 104 is fast enough to unload the wheels with a vertical upwards acceleration greater than gravity (>9.81 $m/s^2$). If the active suspension system 104 is not fast enough, there are various solutions. One example comprises the control system 300 requesting steering force so that one of the wheels becomes leading. Additionally or alternatively, the control system can oscillate the wheels rapidly and out-of-phase to 'walk' up the obstacle. Alternatively, the control system could lift one wheel and request braking force to hold that wheel in its lifted position against the obstacle, and then lift the other impeded wheel to 'walk' up. The third embodiment may not be employed if occupant comfort is important, based on a determination that both leading wheels are concurrently impeded. This is because the third embodiment results in a vertical vehicle body disturbance more than the first and second embodiments.

In an alternative scenario, the vehicle 100 is approaching the wide climbable obstacle from a non-perpendicular direction, such that one leading wheel will reach the obstacle shortly before the other leading wheel. This situation is less likely to be a problem. In this situation, the leading wheel that reaches the obstacle first can be unloaded first according to the pattern described above in relation to FIG. 6A or 6B. The leading wheel that reaches the obstacle second is then unloaded according to the pattern described above in relation to FIG. 6A or 6B.

The first, second and third embodiments described above are not necessarily alternative embodiments, for instance they could be used for different types of obstacle.

FIG. 6C illustrates an optional extension based on the presumption that once the vehicle 100 has climbed the obstacle 200, it is likely that a trailing wheel to the same lateral side as the obstacle 200 will encounter the obstacle 200.

Therefore, a second force request is transmitted to the active suspension system 104. This unloads the impeded trailing wheel so that the trailing wheel can climb the obstacle 200.

FIG. 6C shows a diagonal pattern wherein the impeded rear right wheel RR and front left wheel FL are unloaded and the rear left wheel RL and front right wheel FR are loaded. In other words, the diagonal wheel pairs are the opposite to those shown in FIG. 6B.

If the impeded trailing wheel is instead the rear left wheel RL, then the wheels RL, FR are unloaded and the wheels FL, RR are loaded.

Although trailing wheels are generally less likely to encounter difficulty in climbing obstacles than leading wheels, the approach of FIG. 6C can still improve vehicle composure.

Although FIG. 6C illustrates diagonal loading/unloading like in FIG. 6B, in other examples only the impeded wheel RR is unloaded like in FIG. 6A.

To enable the feature of FIG. 6C, the control system 300 can either specifically determine that vehicle movement is impeded at a trailing wheel, or can assume that vehicle movement will be impeded at a trailing wheel to the same lateral side as the impeded leading wheel, a measured distance/time after the leading wheel has climbed the obstacle 200.

Figure 7:
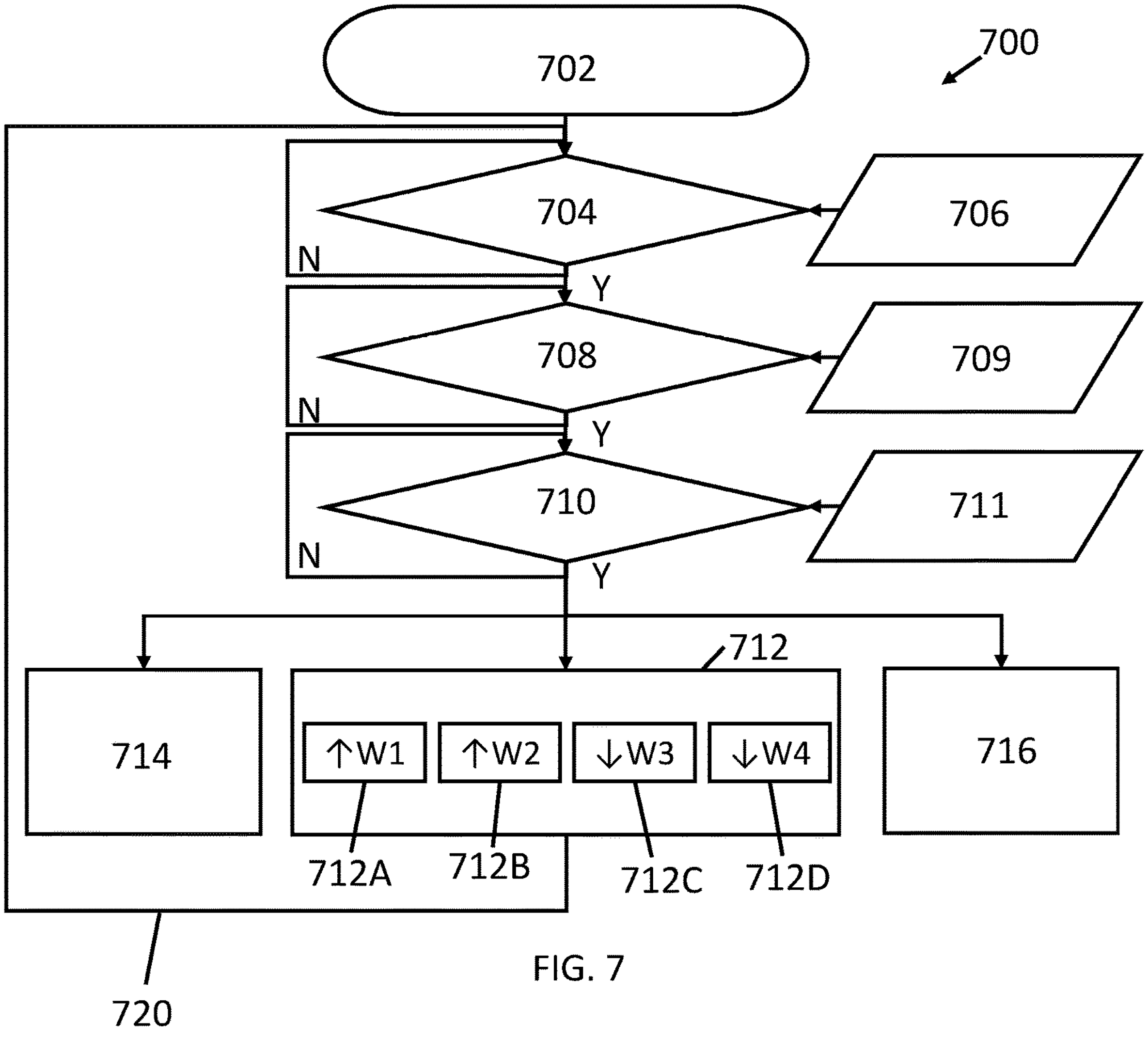
FIG. 7 illustrates an example method.

FIG. 7 illustrates an example implementation method 700 performed by the control system 300. For illustrative purposes and without limitation, the method 700 follows the scenario of the earlier Figures in which the front right wheel FR is impeded.

Operation 702 is a start condition. Three examples are considered.

In the first example, the method 700 is always running while the vehicle 100 is in a certain state, such as a travelable/on state. The start condition may be the vehicle 100 entering said state.

In the second example, the start condition is a manual user trigger request via HMI 520. This is useful for reducing false positives.

In the third example, the start condition is a fully manual user trigger request (user-initiated transient suspension unloading request) via HMI 520 which triggers a force request unconditionally without performing decision blocks 704, 708 and 710.

Operation 704 comprises detecting a climbable obstacle based on sensor information from data block 706. If the obstacle is detected and is a climbable obstacle, the method 700 proceeds. If not, the method 700 loops to repeat at least operation 704.

This operation can be pre-emptive or reactive or omitted entirely. If performed reactively, operation 704 could be performed later than shown in FIG. 7 once the wheel is already impeded. If omitted entirely, the method still works but with increased false positives.

An object detection sensor 526 enables a reactive or pre-emptive detection of an obstacle, depending on its field of view or detection range.

For reactive detection, a set of one or more object detection sensors 526 is employed that have a field of view of the path directly in front of each lateral wheel (FL, FR), within an envelope of the vehicle 100. The field of view therefore includes the vehicle underbody beneath an overhang of the vehicle 100. The overhang refers to the space between the wheel and the nearest bumper.

The object detection sensor 526 could be mounted to the vehicle underbody, or could be mounted to externally mounted side mirrors and either pointed downwards or having a wide vertical field of view. Therefore, the obstacle can be detected once the wheel is already against it.

For pre-emptive detection, a set of one or more object detection sensors 526 is employed that have a field of view of the direction of travel of the vehicle 100 (e.g. +x axis), outside the envelope of the vehicle 100. This enables the object detection sensors 526 to be mounted on exterior panels such as bumpers, or in the vehicle interior.

Once the obstacle is detected, for example in a 3D point cloud or ultrasonic reflection data, operation 704 may determine whether the obstacle is a climbable obstacle or a non-climbable obstacle.

A first variable for determining whether the obstacle is climbable is its height. The method 700 may determine whether a detected height of the detected obstacle is less than a maximum height threshold.

Figure 8A:
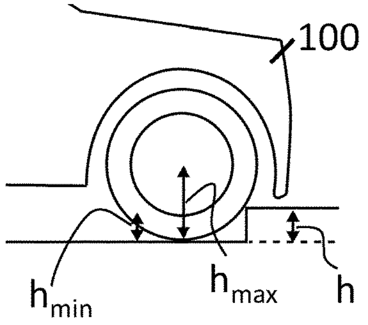
FIGS. 8A, 8B illustrate obstacle height and obstacle profile.

FIG. 8A shows a height h of the obstacle, a maximum height threshold $h_{max}$ and a minimum height threshold $h_{min}$.

The height of the obstacle h may be determined by image processing such as applying an obstacle mask to find candidate lines/features of obstacles in 3D space, and then determining point heights of the obstacle to find a representative maximum obstacle height. Parameters of the obstacle mask may be configured to exclude image features such as undulating terrain or obstacles greater than a certain size. Obstacle masks can be configured to find kerbs and/or ledges.

The maximum height threshold $h_{max}$ may be approximately equal to the height of the centre of the wheel above the bottom of the tyre of the wheel. This is because automotive wheels are unlikely to have sufficiently aggressive tread to pull the vehicle 100 onto a higher ledge. This is typically from the range approximately 10 cm to approximately 50 cm for typical passenger car wheel diameters, and could be greater for commercial/agricultural vehicles. The maximum height threshold could be dependent on ground clearance of the vehicle, so that body-to-ground collision is avoided. A high value of the maximum height threshold expands the limits of the vehicle 100, providing better off-road capabilities for example. The maximum height threshold could be dynamic, varying based on detected/driver-selected terrain type (e.g. slipperiness), and/or current ride height to prevent body-to-ground contact at low ride height settings (e.g. $h_{max}$=f (current ride height)).

The purpose of the minimum height threshold $h_{min}$ is to exclude shallow obstacles that are climbable without the need for any assistance. The minimum height threshold could be a value less than 10 centimetres. A low value of the minimum height threshold is useful when vehicle composure and comfort is prioritized. For example, the methods can improve the experience of mounting roadside kerbs.

For complex shapes such as boulders, the control system may implement a cruder object classification, e.g. size and steepness.

In some examples the driver can be prompted via an HMI 520 to confirm that they wish to proceed to climb the obstacle. This is useful because it cannot always be determined with confidence that the obstacle is inherently climbable.

Figure 8B:
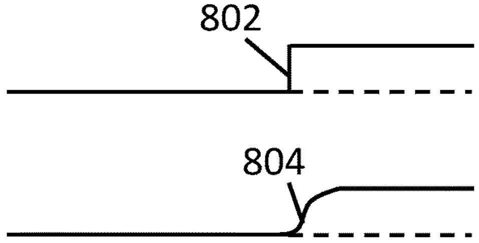

Another optional variable for determining whether the obstacle is climbable is its profile. FIG. 8B shows a first obstacle profile 802 that is a right-angled step. FIG. 8B shows a second obstacle profile 804 that is ramp-like.

The obstacle height is the amount of vertical distance that the contact point at the lowermost point of the tyre must travel. With a right-angled step, the point at which the top corner of the step touches the tread of the tyre is the height. However, with a ramp, the first point along the ramp that touches the tyre tread will be the effective height of the ramp: the rolling radius of the tyre and the gradient of the ramp will influence this. Therefore, the obstacle profile can be factored in by measuring the 'effective height' of the ramp and taking it as the obstacle height.

A long obstacle such as a staircase-like obstacle could be broken up into a series of sequential incremental climbs. This enables the obstacle to have a high elevation but still climbable. In this instance the purpose of the maximum height threshold can be to check that none of the incremental climbs are excessive. The final elevation change can be taller than the maximum height threshold.

Operation 708 is a decision block for determining that vehicle movement is impeded at a wheel of the vehicle 100, using sensor information from data block 709. If the vehicle movement is impeded, the method 700 proceeds. If not, the method 700 may repeat operation 708 for continuous monitoring. This at least partially defines a trigger for outputting the force request.

Examples are provided below. The examples can be classified as reactive sensing only; or pre-emptive sensing that is subsequently confirmed by reactive sensing.

In one embodiment as shown in FIG. 7, operation 708 determines whether the wheel is in contact with the already-detected climbable obstacle. In another embodiment, the obstacle is not already detected.

Applied to the embodiments of FIGS. 6A and 6B, operation 708 determines which one of the wheels of the vehicle 100 is impeded. For example, operation 708 determines which one of a pair of laterally separated wheels (e.g. FL or FR) is impeded.

Examples methods for performing operation 708 are provided below. Use of a reactive sensor is advantageous, firstly to avoid unloading the wheel too early, and secondly in case the vehicle 100 stops before touching the obstacle (e.g. when parking).

The hub accelerometer 516 and/or wheel-to-body displacement sensor 514 of the front right wheel FR can reactively detect a compression that could be caused by the front right wheel FR pressing against the obstacle. If the same sensor(s) of the front left wheel FL do not indicate compression, then this indicates that the front right wheel FR is impeded.

An object detection sensor 526 enables a reactive or pre-emptive detection of which wheel is impeded, depending on its field of view or detection range. In a first approach, one or more object detection sensors 526 are arranged to see the terrain ahead of and beneath the vehicle 100 in front of both wheels FL, FR. In a second approach, a pre-emptively detected obstacle is compared with paths of the front left and front right wheels FL, FR, to see which wheel is impeded by the obstacle.

The steering torque sensor 530 can reactively detect positive and negative torque in the steering system resulting from one steerable wheel being impeded relative to another steerable wheel coupled to the same steering rack. As only one steerable wheel presses against an obstacle, a steering torque is imparted assuming the impeded wheel FR is non-perpendicular to the obstacle.

Measurements from multiple sensing modes could be fused to improve confidence. Speed and/or torque measurements can provide additional confidence, such as vehicle speed, individual wheel speeds, driveline torque, or individual wheel torque. Wheel hub accelerometers could be upgraded to include longitudinal acceleration.

The method 700 may verify that the wheel FR is impeded due to the climbable obstacle rather than some other reason. Vehicle braking may be checked and ruled out as a cause. An object detection sensor 526 with a field of view directly in front of the wheel may detect that the wheel is in contact with the object.

Operation 710 determines that vehicle movement is attempted, with reference to one or more driver requests from data block 711. This means checking that the driver (human or automated) intends to progress to climb the obstacle. This at least partially defines a trigger for outputting the force request. This prevents the force request from being transmitted too early.

In at least some examples, attempted vehicle movement is indicated by requested torque being greater than a torque threshold. If the vehicle 100 is manually controlled, there are at least two potential embodiments for the torque threshold.

In the first embodiment, the torque threshold could be a driver torque threshold greater than zero. Therefore, the force request can only be output if the driver requests sufficient additional torque, for example via an accelerator.

In the second embodiment, the force request can be output if the driver allows the vehicle to creep forwards, with braking below a threshold. The torque threshold could be regarded as a vehicle creep torque-enabled threshold which is any threshold that, when exceeded, indicates that the vehicle 100 is attempting to creep forwards to climb the obstacle. This is associated with vehicles having automatic transmissions and/or synthetic creep functions.

If the vehicle 100 is not manually controlled, the method 700 could proceed when an autonomous driving control function requests sufficient additional torque to climb the obstacle.

In at least some examples, operation 710 checks that the vehicle 100 is not being prevented from climbing the obstacle by checking that requested vehicle braking is less than a threshold. The braking could be friction braking or another form of braking. The requested vehicle braking could be driver-requested vehicle braking.

In at least some examples, operation 710 checks that requested vehicle speed is greater than a threshold, which signals an intent to climb the obstacle and proceed. The requested vehicle speed could be a driver-selected or requested by an autonomous driving function.

One or more of the above-described thresholds can optionally be driver-adjustable (e.g. sensitivity slider via HMI 520). For example, some drivers may be happy for this feature to be triggerable when creeping, whereas other drivers may prefer the feature to be triggerable when the driver is requesting acceleration.

In at least some examples, operation 710 checks that the torque source 103 is coupled to a set of one or more drive wheels (e.g. all four wheels, or a pair of wheels) so is able to drive the vehicle 100 up the obstacle. This may comprise determining that the torque source 103 is in a gear for driving towards not away from the obstacle. This can also feed into a vehicle creep-enabled determination.

Once all the trigger conditions are satisfied, the method 700 proceeds to operation 712 which comprises transmitting a transient force request to the active suspension system 104 to transiently unload at least the impeded wheel. The resulting behaviour is as described and illustrated earlier in relation to FIGS. 6A-6C.

The timing of the force request could be precisely controlled so that as soon as the wheel FR starts to be impeded as detected earlier, the force request is output. As a result, if the vehicle 100 is moving, the vehicle 100 may not be perceptibly slowed down or at least not entirely stopped before climbing the obstacle. The momentum of the vehicle 100 helps to climb the obstacle. In another implementation, the vehicle 100 is allowed to be stopped by the obstacle first. This fast timing can be enabled with scheduling based on pre-emptive sensing and/or can be enabled with sufficiently fast actuators (the actuator 502 is a fast actuator whereas the spring 504 is a slow actuator).

If multiple wheels are unloaded/loaded, the transient force request may comprise a plurality of wheel-specific force requests such as 712A for unloading a first wheel W1, 712B for unloading a second wheel W2, 712C for loading a third wheel W3, and 712D for loading a fourth wheel W4. Applied to the example of FIG. 6B, W1=FR, W2=RL, W3=FL, W4=RR.

After the predetermined time T or detection that the obstacle has been climbed, the transient force request ends and the method 700 could terminate.

Detection that the obstacle has been climbed can be based on a driveline torque sensor measurement, detecting a reduction in torque of the driveline. The detection can be based on wheel hub accelerometer data, detecting the end of a period of vertical acceleration.

If the method 700 is repeated 720 for the trailing wheels, the method 700 loops back to an earlier step before operation 712 and repeats, e.g. for FIG. 6C (W1=FL, W2=RR, W3=FR, W4=RL).

For larger obstacles, the method 700 could request additional torque to coincide with the force request. Operation 714 comprises transmitting a torque increase request to the torque source 103, to cause tractive torque at drive wheels to be at an increased magnitude when the at least one impeded wheel is unloaded.

The benefit is that the driver may not have to intervene with an accelerator, and may not have to select a low-range gear.

After a predetermined time or upon detection that the obstacle has been climbed, the additional torque request ends.

Alternatively, operation 714 may be omitted and existing driveline torque could be maintained.

In at least some examples, pre-emptive application of a brake force can be applied to the unimpeded wheel (e.g. lateral unimpeded wheel) to ensure good torque transfer to the impeded wheel and to limit unwanted wheel slip. This brake force may be controlled based on detected wheel slip or can be a pre-determined value to be applied during the unloading operations.

Another beneficial feature of the active suspension system 104 is the ability to lower the wheel rate (spring rate measured at the wheel) of the impeded wheel, so that the suspension of the impeded wheel provides less vertical restoring force while the vehicle 100 starts to climb the obstacle. Such an approach is shown in FIG. 7 as a force request to change wheel rate 716. Less vertical restoring force is useful because part of the restoring force attempts to spring the vehicle 100 backwards away from the obstacle.

The wheel rate of multiple wheels could be reduced to allow the vehicle body 102 to move freely.

Like the transient force requests of FIGS. 6A, 6B, reducing the wheel rate for the obstacle is not expected to be perceptible to the driver, and will improve body composure.

Reducing the wheel rate may be implemented as a quasi-steady state force offset and as a delay parameter to allow any suspension deflection as a result of quasi-steady state force offset. A quasi-steady state force offset refers to the force required to unload the impeded wheel (overcome spring force) by the required amount to ascent an obstacle. The delay can be dependent on how quickly the feature is deployed, for example there can be a limitation on how quickly a wheel can be lifted/unloaded with an active suspension system 104 (e.g.—but not limited to—1 m/s).

The delay parameter for a given wheel comprises setting a target wheel rate. The target wheel rate $K_{tgt}$ (per corner) is determined as:

$$0<K_{tgt}<\text{BaseWheelRate} \qquad (1)$$

the base wheel rate is the current wheel rate determined according to a base map. The base map can comprise a relationship between wheel rate and a ride height-dependent parameter. In an example, the ride height-dependent parameter comprises pressure and/or volume of the second spring element 504

The wheel rate has a passive component and an active component. The active component is to be controlled.

Therefore, a target active wheel rate $K_{tgt(Active)}$ (per corner) may be determined:

$$K_{tgt(Active@Wheel)}=K_{tgt}-K_{(Base)} \qquad (2)$$

where $K_{(Base)}$ is the instantaneous passive wheel rate (per corner):

$$K_{(Base)}=f(K_{(Base:Map)},\Delta z_{(Whl\_to\_Body)}) \qquad (3)$$

where $K_{(Base:Map)}$ is a f base wheel rate map, and where $\Delta z_{(Whl\_to\_Body)}$ is a wheel-to-body displacement estimate (per corner) to indicate wheel travel, estimated by the sensors 514/516.

As the wheel rate may be affected by ride height, a ride height-dependent parameter may be taken into account when determining the instantaneous passive wheel rate. In an example, the ride height-dependent parameter comprises pressure of the spring 504.

Once the wheel target active wheel rate is known, a gain parameter at the actuator 502 ($K_{tgt(Active@Strut)}$) can be calculated based on the target active wheel rate:

$$K_{tgt(Active@Strut)}=K_{tgt(Active@wheel)}\times MR_{(strut)} \quad (4)$$

where $MR_{(Strut)}$ is the motion ratio of the active strut (actuator) of the wheel which is known to the control system 300.

Based on the gain parameter, a required active force contribution at that corner is determined:

$$F_{tgt}=K_{tgt(Active@Strut)}\times \Delta z_{(Whl\_to\_Body)} \quad (5)$$

Equation 5 defines the force demand as a map (relationship) implemented in a high-level spring controller function of the control system 300. That is, the force demand is calculated based on the gain parameter multiplied by sensed wheel travel (wheel-to-body displacement/articulation). When there is no wheel travel, the active suspension system 104 104 behaves no differently from normal. When the suspension is compressed by climbing the obstacle, the value of the gain parameter will determine the response.

The gain parameter could be regarded as changing the wheel rate of the actuator 502 analogously to changing the stiffness of an equivalent passive spring.

Another beneficial feature of the active suspension system 104 is the ability to change ride height. Therefore, the method 700 may further comprise raising a ride height target of the vehicle 100 (not shown). In an example implementation, the ride height may be lifted if the obstacle comprises a double step or similar sequence of a plurality of climbable obstacles such as a staircase.

In an experiment, a production vehicle produced by the applicant (a mid-sized SUV) was modified to include a fully active suspension system. Using this vehicle, the front right wheel FR was impeded by a 150 mm step of profile 802. The engine of the vehicle was at idle, which provided insufficient torque to the wheels in order to climb the step. The vehicle 100 was in a low-range gear. The active suspension system 104 provided a force request of the form shown in FIG. 6B, each wheel receiving a force of 4.5 kN (positive for one pair, negative for the other pair) for 0.5 seconds. This enabled the vehicle 100 to climb the step at engine-idle.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in the FIG. 7 may represent steps in a method and/or sections of code in the computer program 308. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling an active suspension system of a vehicle, the vehicle having one or more leading wheels and one or more trailing wheels, the control system comprising one or more controller, wherein the control system is configured to:

determine that vehicle movement is impeded at a leading wheel of the vehicle; and in dependence on the determination:

transmit a transient force request to the active suspension system to transiently unload the leading wheel, wherein the transient force request is maintained until no longer than the earlier of a predetermined timeout time and a feedback indication that an obstacle has been climbed, the feedback indication comprising one or more of:

increasing vehicle speed over ground, and an indication that the vehicle is no longer climbing the obstacle in dependence on any of a wheel-to-wheel body displacement, wheel hub or body acceleration data, and a driveline torque sensor measurement.

2. The control system of claim 1, wherein the transient force request is configured to cause the transient unloading of the leading wheel without causing transient unloading of a lateral leading wheel laterally separated from the leading wheel; and wherein the transient force request is configured to cause transient increased loading of the lateral leading wheel.

3. The control system of claim 1, wherein the transient force request is configured to cause transient increased loading of a trailing wheel to a same lateral side of the vehicle as the leading wheel.

4. The control system of claim 1, wherein the transient force request is configured to cause transient unloading of a lateral trailing wheel laterally separated from the leading wheel.

5. The control system claim 4, wherein the control system is configured to cause transient increased loading of a diagonal pair of wheels and transient unloading of a different diagonal pair of wheels.

6. The control system of claim 1, configured to: in dependence on the determination, transmit a torque increase request to a torque source of the vehicle, to cause tractive torque to be at an increased magnitude when the leading wheel is unloaded.

7. The control system of claim 1, wherein the determination is dependent on information from one or more of:

an object detection sensor system configured to detect a climbable obstacle in a path of the at least one leading wheel;

a steering torque sensor configured to detect torque in a steering system of the vehicle coupled to the leading wheel, resulting from the leading wheel being impeded relative to another leading wheel;

a set of suspension displacement-based sensors;

at least one wheel hub-mounted accelerometer; or at least one vehicle body accelerometer.

8. The control system of claim 1, wherein transmitting the transient force request is dependent on determining that an obstacle in a path of the leading wheel is a climbable obstacle or a non-climbable obstacle, in dependence on data from one or more sensors;

and wherein determining whether the vehicle movement is impeded by a climbable obstacle or a non-climbable obstacle comprises determining whether a detected height of the detected obstacle is less than a height threshold.

9. The control system of claim 1, configured to:

receive information indicative of a user trigger request; and in dependence on receiving the user request, monitor for satisfaction of a condition that vehicle movement is impeded at the leading wheel of the vehicle, wherein the transient force request is transmitted when the condition is satisfied.

10. The control system of claim 1, wherein the transient force request is configured to request sufficient transient unloading of the leading wheel to transiently lift the leading wheel away from the ground so as to reduce or remove a point of contact between a tyre of the leading wheel and the obstacle to reduce driving torque necessary to overcome the obstacle.

11. An active suspension system comprising the control system of claim 1.

12. A vehicle comprising the control system of claim 1.

13. The control system of claim 1, configured to determine attempted vehicle movement, wherein the transient force request is transmitted in dependence on the determination of attempted vehicle movement and on the determination that vehicle movement is inhibited, wherein the determination of attempted vehicle movement is dependent on one or more of:

requested torque being greater than a threshold;

requested vehicle braking being less than a threshold;

requested vehicle speed being greater than a threshold; or an indication that a torque source of the vehicle is coupled to a set of one or more drive wheels of the vehicle.

14. The control system of claim 1, wherein the transient force request is terminated in dependence on detection that the vehicle movement is no longer impeded at the leading wheel.

15. The control system of claim 1, configured to:

after the transient unloading of the leading wheel, transmit a trailing wheel transient force request to the active suspension system to cause transient unloading of the trailing wheel.

16. The control system according to claim 1, wherein the predetermined timeout time is from a range of 1 second to 20 seconds.

17. The control system according to claim 1, further configured to, in dependence on the determination, control the active suspension system to reduce a spring rate at the leading wheel so that the suspension of the leading wheel provides less vertical restoring force.

18. A method of controlling an active suspension system of a vehicle, the method comprising:

determining that vehicle movement is impeded at a leading wheel of the vehicle; and in dependence on the determination:

transmitting a transient force request to the active suspension system to transiently unload the leading wheel, and controlling the active suspension system to reduce a spring rate at the leading wheel so that the suspension of the leading wheel provides less vertical restoring force, wherein the transient force request is maintained until no longer than the earlier of a predetermined timeout time and a feedback indication that an obstacle has been climbed, the feedback indication comprising one or more of:

increasing vehicle speed over ground, and an indication that the vehicle is no longer climbing the obstacle in dependence on any of a wheel-to-wheel body displacement, wheel hub or body acceleration data, and a driveline torque sensor measurement.

19. A non-transitory computer readable medium having stored thereon software that, when executed, is arranged to perform the method according to claim 18.

20. A control system for controlling an active suspension system of a vehicle, the control system comprising one or more controllers, wherein the control system is configured to:

determine a transient suspension unloading request indicating a selected lateral side of the vehicle; and in dependence on the determination, transmit a transient force request to the active suspension system to cause: (i) transient unloading of a wheel of the vehicle at the selected lateral side of the vehicle, and (ii) reduction of a spring rate at the wheel so that the suspension of the wheel provides less vertical restoring force, wherein the transient force request is maintained until no longer than the earlier of a predetermined timeout time and a feedback indication that an obstacle has been climbed, the feedback indication comprising one or more of:

increasing vehicle speed over ground, and an indication that the vehicle is no longer climbing the obstacle in dependence on any of a wheel-to-wheel body displacement, wheel hub or body acceleration data, and a driveline torque sensor measurement.

* * * * *